(12) United States Patent
Tang et al.

(10) Patent No.: US 6,390,369 B1
(45) Date of Patent: May 21, 2002

(54) STREAMLINED SCANNER SPINNER

(75) Inventors: Hong Tang, Suwanee; Paul O. Detwiler, Lawrenceville, both of GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/792,459

(22) Filed: Feb. 23, 2001

(51) Int. Cl.$^7$ .............. G02B 26/00; G06K 7/10
(52) U.S. Cl. .............. 235/462.4; 235/462.39; 235/462.36; 235/462.35; 235/462.14
(58) Field of Search ............ 235/467.4, 462.39, 235/462.35, 462.14, 462.36

(56) References Cited

U.S. PATENT DOCUMENTS

| | | | |
|---|---|---|---|
| 4,458,982 A | | 7/1984 | Blain et al. |
| 4,461,534 A | | 7/1984 | Runciman |
| 4,870,274 A | | 9/1989 | Hebert et al. |
| 5,073,702 A | * | 12/1991 | Schuhmacher ............ 235/467 |
| 5,115,122 A | * | 5/1992 | Jwo et al. ............ 235/467 |
| 5,274,491 A | * | 12/1993 | Collins, Jr. et al. ..... 235/455 X |
| 5,343,029 A | | 8/1994 | Katoh et al. |
| 5,361,158 A | * | 11/1994 | Tang ............ 235/467 X |
| 5,979,767 A | | 11/1999 | Schonenberg et al. |
| 6,293,468 B1 | * | 9/2001 | Rantze et al. .......... 235/462.25 |

FOREIGN PATENT DOCUMENTS

| | | |
|---|---|---|
| JP | 1-201620 | 8/1989 |
| JP | 4-62513 | 2/1992 |
| JP | 6-43379 | 2/1994 |
| JP | 3-63613 | 5/1996 |
| JP | 8-205451 | 8/1996 |
| JP | 8-123893 | 5/1997 |
| JP | 9-127452 | 5/1997 |
| JP | 10-333 072 | 12/1998 |
| JP | 411249058 A * | 9/1999 |

OTHER PUBLICATIONS

Shepard, "Windage of Rotating Poygons," Optical Scanners, 1991, Chapter 8.
[Japanese translations of Abstracts only].

* cited by examiner

Primary Examiner—Michael G. Lee
Assistant Examiner—Daniel Walsh
(74) Attorney, Agent, or Firm—Francis L. Conte, Esq.

(57) ABSTRACT

A spinner for a barcode scanner includes mirror facets arranged in a polygon about a rotary axis. A fairing extends radially outwardly from adjacent the facets, and is circumferentially truncated therearound for aerodynamically streamlining the spinner.

29 Claims, 4 Drawing Sheets

US 6,390,369 B1

STREAMLINED SCANNER SPINNER

CROSS REFERENCE TO RELATED APPLICATION

This application is related to patent application Ser. No. 09/471992, filed Dec. 23, 1999, entitled "Extended Coverage Barcode Scanner."

BACKGROUND OF THE INVENTION

The present invention relates generally to barcode scanners, and, more specifically, to rotary spinners therein.

Presentation and pass-by type barcode scanners include rotating spinners for reflecting a laser beam to project a scan line pattern across a barcode for scanning and decoding thereof. The spinner includes a row of mirror facets arranged in a polygon for segmenting the laser beam and reflecting the beam segments from cooperating pattern mirrors specifically oriented in the barcode scanner for producing the desired pattern of scan lines.

Since the pattern is repeated once per revolution of the spinner, the spinner facets and the cooperating pattern mirrors must be precisely positioned to produce the desired pattern of limited number of scan lines for the outbound scan beam, as well as collecting sufficient light in the inbound reverse path through the pattern mirrors and spinner for decoding thereof. Whereas the outbound scan beam is distinct and bright, the inbound collection light is diffuse from reflecting off the barcode at various angles.

Accordingly, optical performance of the barcode scanner is directly affected by the configuration of the rotary spinner and its mirror facets. The spinner rotates at a relatively high speed of about 4,000–8,000 rpm, for example, for producing an effective scanning pattern, with the spinner facets being sufficiently large for collecting sufficient inbound return light for decoding the barcode.

However, the relatively large spinner facets and the high rotational speed thereof create substantial windage drag in the typical air environment. Windage requires a suitably powerful motor for rotating the spinner to overcome the air drag forces. And, windage produces substantial aerodynamically generated noise from the rotating spinner during operation. Audible noise from the operating spinner is undesirable and should be minimized in commercially competitive barcode scanners.

However, the form and size of the spinner facets directly affect windage and noise generated during operation, and are typically determined by the desired optical performance of the scanner.

Typical spinners may include three, four, five, or more facets arranged in a polygon around a common rotary axis in a generally axisymmetrical configuration. In a recent development, a four-faceted rectangular spinner enjoys certain advantages in the resulting scan line pattern produced therefrom. The rectangular spinner experiences even greater windage and greater noise during operation which undesirably detract from the improved optical performance thereof.

Accordingly, it is desired to provide a streamlined barcode spinner for reducing windage drag without reducing optical performance.

BRIEF SUMMARY OF THE INVENTION

A spinner for a barcode scanner includes mirror facets arranged in a polygon about a rotary axis. A fairing extends radially outwardly from adjacent the facets, and is circumferentially truncated therearound for aerodynamically streamlining the spinner.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
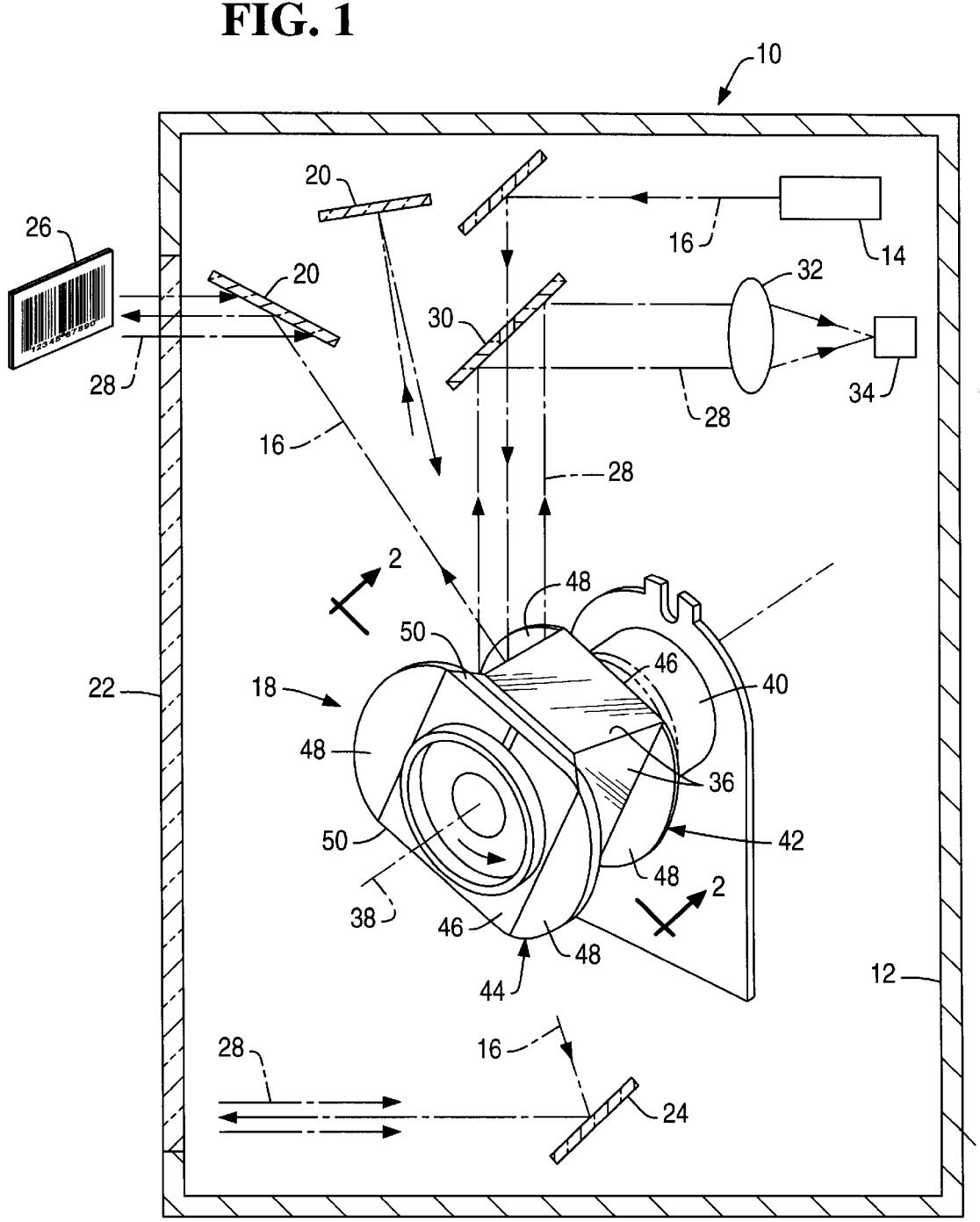
FIG. 1 is an schematic representation of a barcode scanner having a streamlined spinner in accordance with an exemplary embodiment of the present invention.

Illustrated schematically in FIG. 1 is a barcode scanner 10 which may be configured for presentation or pass-by operation as desired. The scanner includes a housing 12 in which its various operating components are suitably mounted.

A laser 14, typically in the form of a laser emitting diode (LED), is mounted in the housing for emitting an outbound laser beam 16. A rotary spinner 18 is suitably disposed in the outbound optical beam path with the laser 14 for segmenting the beam in corresponding optical paths in alignment with a plurality of primary pattern mirrors 20 which reflect corresponding scan lines out a transparent window 22 of the scanner. The scan lines may be produced from direct reflection between the spinner and the primary pattern mirrors, or secondary pattern mirrors 24 may be optically aligned with corresponding ones of the primary pattern mirrors to produce the desired scan line pattern emitted through the window 22.

The pattern mirrors may be oriented in the scanner housing in any conventional manner for producing the desired scan line pattern for each revolution of the spinner 18. In this way, a conventional barcode 26 may be positioned in front of the window 22 for being traversed by any one or more of the scan lines in the pattern for returning reflected light 28 therefrom inbound in the opposite direction for collection by the pattern mirrors 20,24 and rotating spinner 18 for decoding.

A suitable collection mirror 30 is suitably optically aligned between the laser 14 and the spinner 18, and typically includes a center aperture therein through which the outbound scan beam 16 passes without obstruction. Since the reflected light 28 is diffuse from being reflected off the barcode 26, the pattern mirrors, spinner, and collection mirror 30 are suitably sized in area for collecting sufficient reflected light 28 for use in decoding the barcode.

The reflected or collection light 28 is reflected from the collection mirror 30 and focused through a suitable focusing lens 32 onto a conventional photodetector 34 which produces a corresponding electrical signal which is decoded in the electrical controller of the scanner in a conventional manner.

But for the spinner 18 illustrated in FIG. 1, the remaining components of the barcode scanner may have any conventional configuration for directing the laser beam 16 outbound to the barcode and then collecting the inbound return light 28 therefrom for decoding the barcode. The spinner 18 includes a plurality of mirror facets 36 arranged circumferentially in any suitable polygon about a rotary or centerline axis 38. The spinner is joined to an electrical motor 40 suitably mounted inside the scanner housing for rotating the spinner at the desired speed, which may be about 4000–8000 rpm, for example.

The spinner facets 36 are flat mirrors of suitable surface area for collecting sufficient return light 28 for detection by the photodetector 34. In the exemplary embodiment illustrated in FIG. 1 the individual facets 36 are generally rectangular or trapezoidal, and circumferentially abut each other at common corners or edges for using substantially the full 360° available budget of the laser beam being segmented from facet to facet as the spinner rotates.

The relatively large spinner facets and their polygon arrangement can create substantial windage drag in the air environment found within the scanner housing 12. The motor 40 must be suitably sized in power to overcome the windage drag for long-life operation of the scanner in its intended environment.

Furthermore, windage is typically associated with corresponding noise generated therefrom which is aesthetically undesirable in a modern barcode scanner. That windage-induced noise is substantially reduced in accordance with the present invention by providing one or more circumferentially truncated fairings 42,44 extending radially outwardly from adjacent the facets 36 on correspondingly opposite ends thereof. The fairings are circumferentially truncated around the circumferential extent of the facets for aerodynamically streamlining the overall spinner, in particular at the facets for reducing windage and associated noise therefrom.

In the exemplary embodiment illustrated in FIG. 1, the first and second fairings 42,44 axially adjoin opposite ends of the facets 36 and protrude radially outwardly therefrom, while also being circumferentially truncated for streamlining the spinner. The first fairing 42 is disposed at the base of the facets directly adjacent the motor 40, whereas the second fairing 44 is disposed at the top or head of the facets opposite from the motor. Although both fairings 42,44 are illustrated in the exemplary embodiment, either one or the other fairing may be used alone in alternate embodiments of the present invention depending upon the specific configuration thereof and the amount of noise attenuation desired.

Figure 2:
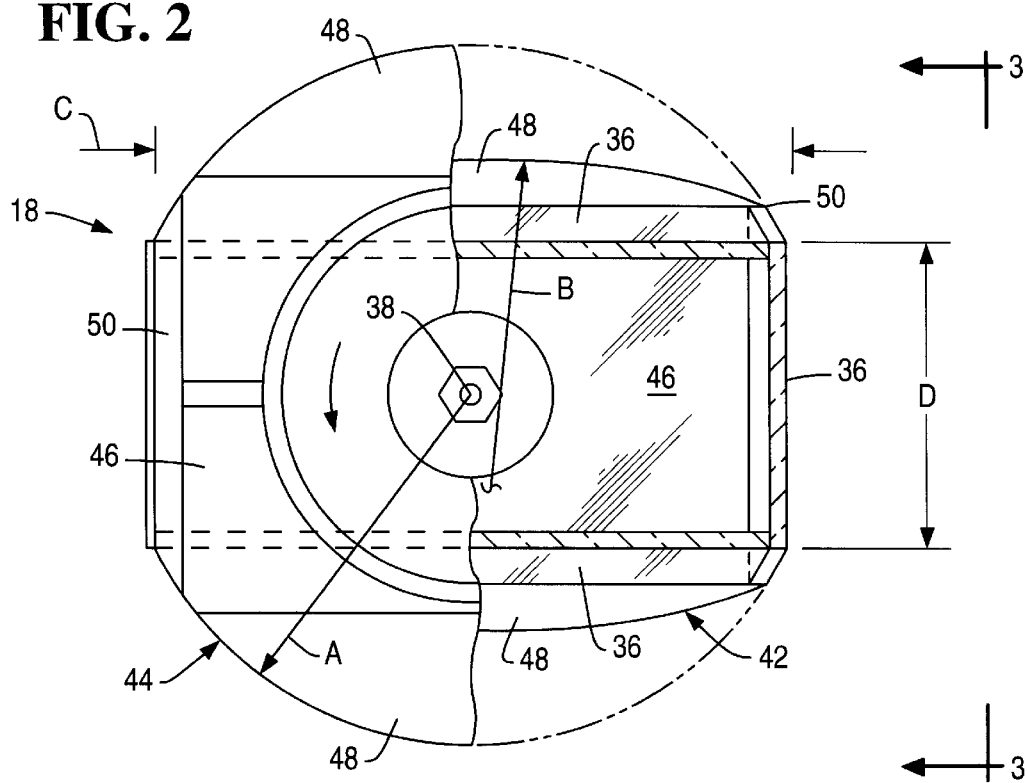
FIG. 2 is a partly sectional top view of the spinner illustrated in FIG. 1 and taken along line 2—2.

As shown in FIGS. 1 and 2, each fairing preferably includes a central hub 46 in the form of a flat plate which substantially encloses the bottom and top ends of the facets, and may provide integral parts of the mounting frame therefor. The respective hubs axially adjoin the group of facets, preferably in direct contact therewith. And, each fairing includes a plurality of circumferentially spaced apart fins 48 extending radially outwardly from the integral supporting hub.

As best illustrated in FIG. 2, the fins 48 are preferably arcuate with convex outer edges, and are spaced circumferentially apart from each other along straight edges 50 of the hub disposed generally parallel to the facets. The hub edges 50 define circumferential notches or interruptions in the circumferential continuity in the otherwise annular configuration of the fairing, and separates the fins 48 from each other in each fairing.

Each fin 48 preferably has a chordal segment configuration with a convex outer edge tapering to opposite points where it meets the straight chord junction with the supporting hub 46. In the second fairing 44, the fins 48 preferably have a common outer diameter 2A disposed coaxially with the rotary axis 38. In this configuration, the entire second fairing 44 has a common radius outer perimeter along the fins 48 locally interrupted by the hub edges 50 defining respectively chords.

FIG. 2 also illustrates another embodiment for the first fairing 42 in which the fins 48 thereof have equal radii B with different origins or radial centers not coincident or coaxial with the rotary axis 38. For example, the fins of the first fairing 42 are narrower than the fins of the second fairing 44, which may be obtained by using a relatively large radius B for the first fairing which is greater than the radius of the second fairing.

As indicated above with respect to FIG. 1, the spinner 18 has relatively large area facets 36 sized for receiving the return light 28 for collection by mirror 30 and detection by the photodetector 34. The specific scan pattern emitted through the scanner window 22 is precisely controlled by the size, orientation, and optical cooperation between the spinner facets 36 and the pattern mirrors 20,24.

The single outbound laser beam 16 may only be segmented by the spinner into a finite number of scan lines produced by the pattern mirrors, which pattern mirrors and spinner facets must also collect the return light 28 with maximum performance. Accordingly, it is undesirable for either fairing 42,44 to in any way obstruct either the outbound laser beam or the inbound return light being collected which would adversely affect performance of the scanner.

Accordingly, each of the fairings 42,44 is specifically configured with circumferential truncation, or radial truncation, as desired to limit or prevent obstruction of the outbound or inbound light while also providing a suitable amount of streamlining of the spinner for reducing windage and associated noise therefrom.

Circumferential truncation is provided by the straight edges 50 interrupting the circumferential continuity of the fins over respective portions of the facets without obstructing the outbound or inbound optical reflection paths effected by the facets.

Radial truncation is provided by limiting the radial protrusion of the fins and edges over the respective portions of the facets without obstructing the outbound or inbound optical reflection paths. The fins protrude radially outwardly from the facets to effect aerodynamic streamlining, which radial protrusion is substantially more than that of the edges relative to their corresponding facets, with the so recessed edges avoiding obstruction of the outbound and inbound optical paths.

Each fin 48 is relatively thin and provides a thin edge which cuts the surrounding air as the spinner rotates during operation. Although the fins do not extend completely circumferentially, they nevertheless slice the air inside the housing in a manner for effectively reducing windage and noise generation. However, the specifically configured interruptions in the circumferential continuity between the fins is used to advantage to prevent obstruction of the optical path created by the spinner.

More specifically, in the exemplary embodiment initially illustrated in FIGS. 1 and 2, four facets 36 are arranged in a rectangle of two long facets of nominal length C and two short facets of nominal length D. Correspondingly, each of the two fairings 42,44 includes two fins 48 equiangularly spaced apart from each other on opposite sides of the spinner, with the fins preferably extending parallel to and along the long facets, with the hub straight edges 50 extending parallel to and along the short facets.

Each of the several fins 48 protrudes symmetrically outwardly from a respective one of the long facets 36-C generally perpendicular thereto. And, each of the hub edges 50 is parallel to a respective one of the short facets 36-D, and extends symmetrically therealong over the full length thereof.

Figure 3:
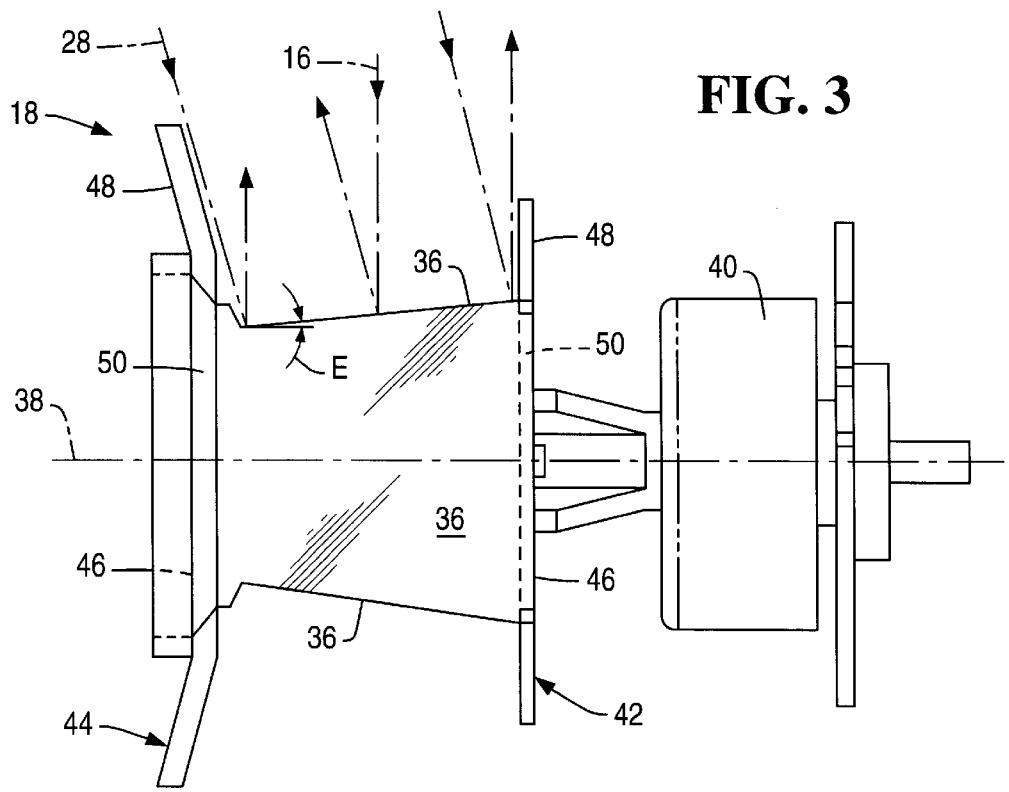
FIG. 3 is a side elevational view of the spinner illustrated in FIG. 2 and taken along line 3—3 with a short facet thereof being illustrated.
Figure 4:
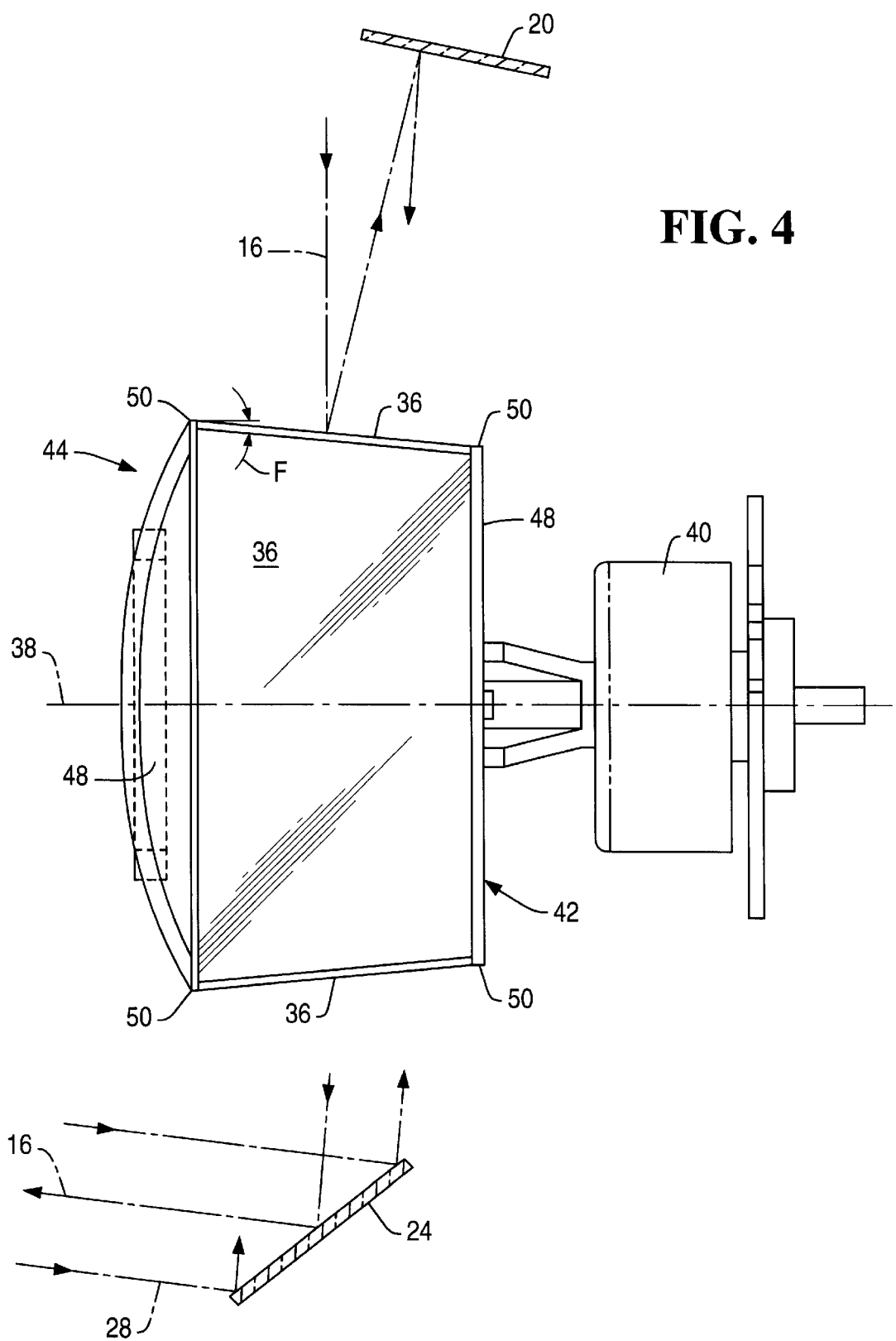
FIG. 4 is a side elevational view of the spinner illustrated in FIG. 2 with a long facet hereof being illustrated.

As shown in FIGS. 3 and 4, each of the facets 36 has a respective inclination angle specifically chosen for reflecting the scan beam 16 outbound and the collection light 28 inbound in any conventional manner. The long and short facets preferably have opposite inclination angles E,F for cooperating with respective ones of the various pattern mirrors.

FIG. 3 for example, the long facets 36 have an inclination angle E relative to the rotary axis 38 for reflecting the scan beam 16 generally to the left as illustrated therein. Whereas, the short facets 36 illustrated in FIG. 4 have an opposite inclination F for reflecting the scan beam 16 to the right. Each of the two long facets and each of the two short facets have slightly different inclination angles for cooperating with the respectively pattern mirrors for producing any desired scan line pattern in a conventional manner. In this way, each of the resulting scan lines generated by reflection from each of the spinner facets and each of the pattern mirrors is different from the other for collectively producing an intersecting pattern of scan lines for each revolution of the spinner.

Correspondingly, the collection light 28 illustrated in FIGS. 3 and 4 returns on the same path as the outbound scan beam 16 but in reverse for each of the pattern mirrors and spinner facets. Accordingly, the fairings 42,44 are specifically truncated and configured to prevent obstruction of either the outbound or inbound light irrespective of the different reflection off the cooperating spinner facets.

For the first fairing 42 illustrated in FIGS. 3 and 4, the fins 48 thereof are preferably coplanar, or lie in a single axial plane, and extend radially outwardly from the rotary axis 38. Correspondingly, the fins 48 of the second fairing 44 are inclined axially from the respective hub 46 and adjacent facets 36.

In FIG. 3 the long facets 36 are inclined at the inclination angle E so that the outbound scan beam 16 is reflected to the left therein. Although the scan beam 16 traces a bright single line across the rotating spinner facet, the inbound collection light 28 is diffuse and covers the entire surface area of the facet specifically provided for collection thereof, which collection light is received generally parallel to the outbound scan beam 16. Accordingly, the fins of the second fairing 44 are inclined axially outwardly from the inclined facets 36 so that they do not obstruct the inbound path of the collection light 28 over the full surface area of the facets. The inclination angle of the fins 48 may be chosen to parallel the outbound inclination angle of the scan beam 16.

Since the inbound collection light 28 is inclined to the left of the fairing 42, that fairing may remain coplanar without inclination since it is not within the inbound optical path for the collection light 28.

As shown schematically in FIG. 4, the outbound scan beam 16 is first reflected off one of the short facets 36, and in turn off a cooperating primary pattern mirror 20 which in turn reflects the outbound scan beam to a cooperating secondary pattern mirror 24 on the opposite side of the spinner prior to directing the scan beam out of the scanner. In view of the particular alignment of the primary and secondary pattern mirrors in this exemplary embodiment, fins are not used in the first fairing 42 along the short facets 36, but instead the straight hub edges 50 run parallel to the bottom edges of the short facets and terminate thereat or slightly therebefore so that the hub edges do not protrude radially outwardly from those short facets. In this way, the outbound optical path between the primary and secondary pattern mirrors 20,24 is not interrupted or obstructed by the first fairing 42.

Although the second fairing 44 could have additional fins along the short facets 36, the nonprotruding hub edges 50 are also preferred for the second fairing for reducing spinner weight without significantly affecting noise generation.

The specific size and configuration of the two fairings 42,44 illustrated in FIG. 2 may be determined by the specific optical paths required inbound and outbound to and from the spinner facets 36 and particular inclination angles thereof. In the exemplary embodiment illustrated, the second fairing 44 is larger than the first fairing 42 with the fins 48 thereof protruding further radially outwardly from the long spinner facets. And, the corresponding straight hub edges 50 of the two fairings are preferably aligned parallel with the short spinner facets and terminate thereat without protrusion. Optical performance of the spinner without obstruction by the fairings is obtained, with a substantial reduction of windage and noise generated therefrom.

Figure 5:
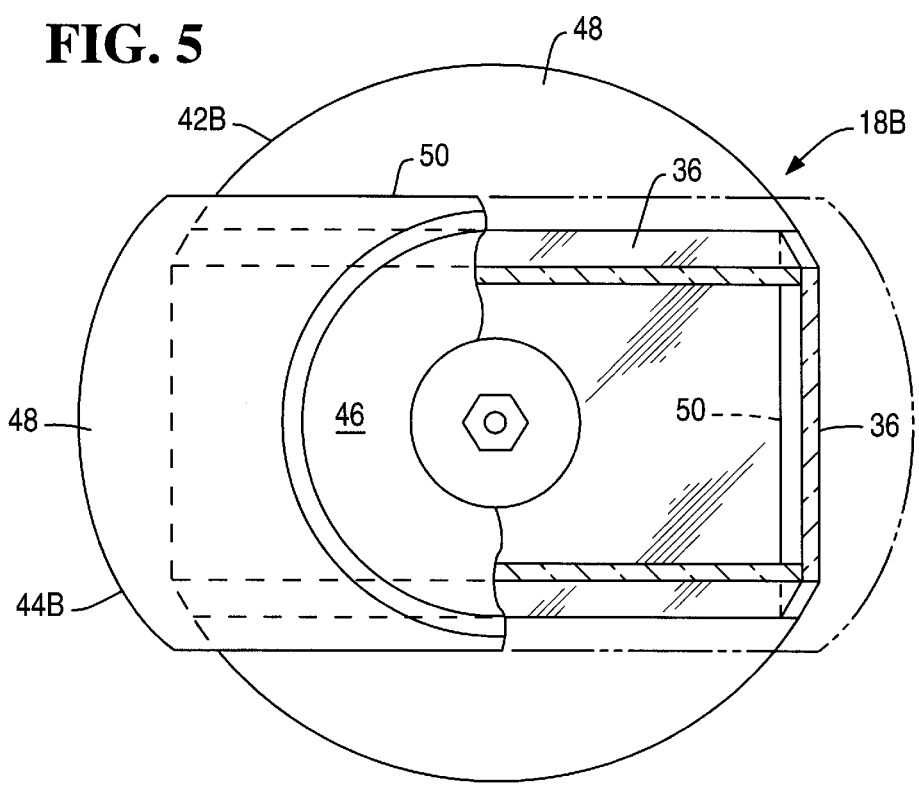
FIG. 5 is a top view of the barcode spinner, like FIG. 2, in accordance with an alternate embodiment of the present invention.

FIG. 5 illustrates an alternate embodiment of the rectangular spinner, designated 18B. In this embodiment, a first fairing 42B is a planar circular disk with opposite portions removed to define the straight hub edges 50 disposed parallel to the short facets 36, with the fins 48 thereof being disposed parallel to the long facets.

The second fairing 44B is also a planar disk with opposite sides thereof removed along the corresponding hub edges 50 which extends parallel to the long facets, with the correspondingly smaller fins 48 protruding outwardly from the short facets and having chords parallel thereto.

The straight edges of the second fairing 44B protrude radially outwardly from the respectively long facets, whereas the straight edges of the first fairing 42B do not protrude outwardly from the respective short facets.

In FIG. 5 the first and second fairings 42B,44B have respective fins circumferentially offset from each other at 90°, and correspondingly, the hub edges 50 of the two fairings are also circumferentially offset from each other by 90° to run parallel to the corresponding short and long spinner facets.

This is in contrast with the first and second fairings 42,44 of FIG. 2 in which the respective fins of the two fairings are circumferentially aligned with each other in matching circumferential positions, with the corresponding straight edges 50 also being aligned and parallel to each other along the short spinner facets.

Figure 6:
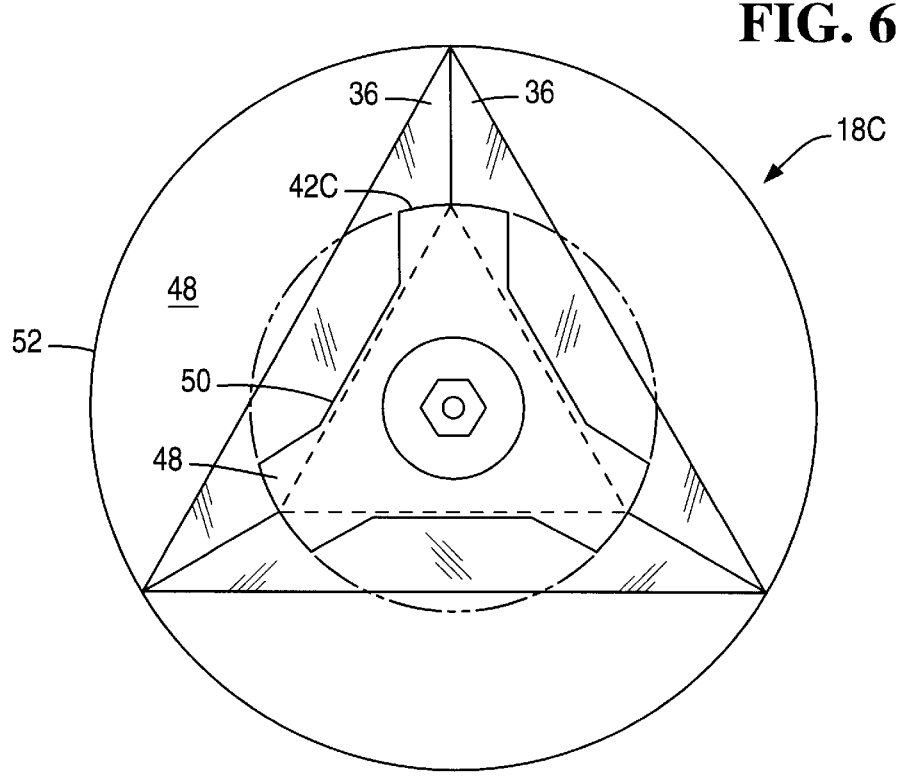
FIG. 6 is a top view of a barcode spinner in accordance with another embodiment of the present invention.

FIG. 6 illustrates yet another embodiment of a spinner, designated 18C, which includes three trapezoidal spinner facets 36 arranged in a three-sided polygon or truncated pyramid.

In this embodiment the first fairing 42C is again circumferentially truncated, but the second fairing 52 is a non-truncated circular fairing in the form of a disk plate which circumscribes the triangular base of the three mirror facets 36.

The circumferentially truncated first fairing 42C is axisymmetrical about the rotary axis of the spinner and has a triangular configuration by removing respective portions from an otherwise circular disk. Each of the fins 48 protrudes radially outwardly from corresponding common corners or junctions of the adjoining facets, with the corresponding hub edges 50 extending symmetrically therebetween generally parallel to the middle portions of each of the three facets at the top end of the truncated pyramid.

In this embodiment the fins 48 are not chord segments, but instead have a common-radius arcuate outer edge with circumferentially opposite straight side edges in the form of a generally rectangular tab.

In this way, the fins 48 protrude outwardly from the respective spinner facets at the corner junctions thereof for streamlining the spinner during rotary operation. And, the straight edges 50 run parallel to the corresponding facets between the fins for minimizing or preventing obstruction in the inbound collection light path. The hub edges 50 may protrude outwardly from the facets as desired in a compromise between streamlining performance and optical performance.

In the various embodiments disclosed above, the truncated fairings include fins for aerodynamically streamlining the spinner to reduce windage drag and associated noise, without compromising the outbound or inbound optical light paths. Since the optical paths are determined by the size, configuration, and orientation of the spinner facets and pattern mirrors, the fairings may be used at either or both axial ends of the spinner as desired for reducing windage without compromising optical performance.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

What is claimed is:

1. A spinner for a barcode scanner comprising:
   a plurality of mirror facets arranged in a polygon about a rotary axis; and
   a fairing extending radially outwardly from adjacent said facets for aerodynamically streamlining said spinner, and circumferentially truncated therearound by straight edges disposed parallel to respective ones of said facets between corresponding fins extending radially outwardly from said facets greater than said straight edges.

2. A spinner according to claim 1 wherein said fairing includes a hub axially adjoining said facets, and said fins and edges extend radially outwardly therefrom.

3. A spinner according to claim 2 wherein said fins are arcuate.

4. A spinner according to claim 3 wherein said fins have a chordal segment configuration.

5. A spinner according to claim 4 wherein said fins have a common outer diameter disposed coaxially with said rotary axis.

6. A spinner according to claim 4 wherein said fins have equal radii with different radial centers.

7. A spinner according to claim 3 wherein said fins have circumferentially opposite straight edges joined to an arcuate outer edge.

8. A spinner according to claim 3 wherein said fins are coplanar and extend radially outwardly from said rotary axis.

9. A spinner according to claim 3 wherein said fins are inclined from said hub.

10. A spinner according to claim 9 wherein:
    each of said facets has an inclination angle for reflecting a scan beam outbound and collection light inbound; and
    said fins are inclined axially outwardly from said inclined facets.

11. A spinner according to claim 3 wherein said fins are equiangularly spaced apart.

12. A spinner according to claim 11 wherein each of said fins protrudes symmetrically outwardly from a respective one of said facets.

13. A spinner according to claim 11 wherein each of said hub edges is symmetric along a respective one of said facets.

14. A spinner according to claim 13 wherein said hub edges do not protrude from said respective facets.

15. A spinner according to claim 13 wherein said hub edges protrude from said respective facets.

16. A spinner according to claim 11 wherein each of said hub edges is parallel to a respective one of said facets.

17. A spinner according to claim 16 wherein each of said fins protrudes outwardly from a common junction of adjoining facets.

18. A spinner according to claim 16 wherein said hub edges protrude from said respective facets.

19. A spinner according to claim 3 wherein said truncated fairing axially adjoins one end of said facets as a first fairing, and further comprising a second fairing axially adjoining an opposite end of said facets, and extending radially outwardly therefrom.

20. A spinner according to claim 19 wherein said second fairing is axisymmetrical.

21. A spinner according to claim 20 wherein said second fairing is circular.

22. A spinner according to claim 20 wherein said second fairing is circumferentially truncated, and includes protruding fins and hub edges therebetween.

23. A spinner according to claim 22 wherein said first and second fairings have circumferentially aligned fins, and circumferentially aligned hub edges.

24. A spinner according to claim 22 wherein said first and second fairings have circumferentially offset fins, and circumferentially offset hub edges.

25. A spinner for a barcode scanner comprising:

a plurality of mirror facets arranged in a polygon about a rotary axis; and first and second fairings axially adjoining opposite ends of said facets for aerodynamically streamlining said spinner, and each fairing is circumferentially truncated around said spinner by straight edges disposed parallel to respective ones of said facets between corresponding fins extending radially outwardly from said facets greater than said straight edges.

26. A spinner according to claim 25 wherein said first and second fairings each includes a hub, and said fins and edges extend radially outwardly therefrom.

27. A spinner according to claim 26 further comprising four of said facets arranged in a rectangle of two long and two short facets; and wherein said fins extend along said long facets, and said hub straight edges extend along said short facets.

28. A spinner according to claim 27 wherein said first fairing is planar, and said fins of said second fairing are inclined axially from said facets.

29. A spinner according to claim 28 wherein said long and short facets have opposite inclination angles, and said hub edges do not protrude from said short facets.

* * * * *